United States Patent [19]

Sakai

[11] Patent Number: 5,002,146
[45] Date of Patent: Mar. 26, 1991

[54] TRACTION CONTROL SYSTEM

[75] Inventor: Takashi Sakai, Saitama, Japan

[73] Assignees: Akebono Brake Industry Co., Ltd., Tokyo; Akebono Research and Developement Centre Ltd., Saitama, both of Japan

[21] Appl. No.: 244,375

[22] Filed: Sep. 14, 1988

[30] Foreign Application Priority Data

Sep. 24, 1987 [JP] Japan .................... 62-237391

[51] Int. Cl.⁵ ................ B60K 28/10; F02D 11/110
[52] U.S. Cl. ................ 180/197; 180/335; 123/342
[58] Field of Search ........... 180/197, 175, 177, 335, 180/76; 123/342; 364/426.01, 426.03

[56] References Cited

U.S. PATENT DOCUMENTS

| 4,077,370 | 3/1978 | Spangenberg | 123/342 |
| 4,354,799 | 10/1982 | Hurst | 414/756 |
| 4,703,823 | 11/1987 | Yogo et al. | 180/197 |
| 4,834,044 | 5/1989 | Maas | 123/342 |
| 4,856,476 | 8/1989 | Shirakawa | 123/342 |
| 4,862,852 | 9/1989 | Kamibayashi | 180/197 X |

Primary Examiner—Charles A. Marmor
Assistant Examiner—Mitchell Bompey
Attorney, Agent, or Firm—Finnegan, Henderson, Farabow, Garrett, and Dunner

[57] ABSTRACT

A traction control system comprises a control piston mounted within a control cylinder disposed between a throttle lever and an accelerator pedal, a first cable an end of which is connected to the control piston whereas the other end is connected to the throttle lever, a second cable an end of which is connected to the control piston whereas the other end is connected to the accelerator pedal, fixed pulleys guiding the second cable, a movable pulley urged by a balance spring toward a direction in which the second cable stretches, and a pressure control device supplying a fluid pressure to a control chamber of the control cylinder so that the control piston moves toward a direction in which the first cable slacks thereby allowing the throttle lever to return.

13 Claims, 4 Drawing Sheets

5,002,146

TRACTION CONTROL SYSTEM

BACKGROUND OF THE INVENTION

The present invention relates generally to a traction control system for use in a vehicle and the like. More particularly the invention relates to a system for preventing a slip of the wheels of the vehicle during an accelerating condition thereof, for example, at the time when the vehicle starts and accelerates. The system may be compatible with a throttle-opening control effected by the operation of an accelerator pedal of the vehicle with a device simple in construction.

There has been known a conventional traction control system of the type in which a throttle is controlled by a stepping motor or the like operated by an electronic control device. Therefore, it has been difficult to use such a conventional traction control system in a manner to be compatible with the throttle-opening control effected by the operation of the accelerator pedal by the driver of the vehicle.

Moreover, since the conventional traction control system employs a stepping motor, the control may be complicated, and total cost for the system is unduly disadvantageously increased.

SUMMARY OF THE INVENTION

Accordingly, an object of the present invention is to eliminate the above-described difficulty and problems accompanying a conventional traction control system. More specifically, an object of the invention is to provide a traction control system which can be used in a manner to be compatible with the throttle-opening control by the accelerator pedal, and is simple in construction.

The foregoing and other objects have been achieved by the provision of a traction control system of the present invention comprising: a control piston mounted within a control cylinder disposed between a throttle lever and an accelerator pedal; a first cable an end of which is connected to the control piston whereas the other end is connected to the throttle lever; a second cable an end of which is connected to the control piston whereas the other end is connected to the accelerator pedal; fixed pulleys guiding the second cable; a movable pulley urged by a balance spring toward a direction in which the second cable stretches; a pressure control device supplying a fluid pressure to a control chamber of the control cylinder so that the control piston moves toward a direction in which the first cable slacks thereby allowing the throttle lever to return.

When no wheel acceleration slip occurs, a control piston does not move, and a throttle lever is controlled to pivotally move in accordance with the operation of an accelerator pedal.

When a wheel acceleration slip begins to occur, a pressure control device is responsive to a wheel acceleration slip signal to supply a fluid pressure to the control piston. As a result, the control piston moves to slacken a first cable, so that the throttle lever returns to decrease the traction, thereby eliminating the acceleration slip.

When the control piston moves as described above, a balance spring is not compressed if the accelerator pedal is slightly pressed down, and a second cable is pulled by the control piston, so that the accelerator pedal returns. However, if the accelerator pedal is strongly and deeply pressed down, the first cable is slackened to return the throttle lever as the control piston moves, but the accelerator pedal does not return since the movement of the second cable pulled by the control piston causes a movable pulley to move and compress the balance spring.

Thus, the traction control for eliminating the wheel acceleration slip is carried out without a failure regardless of the amount of pressing down of the accelerator pedal.

Since the traction control system is of such a construction that the first and second cables connecting the throttle lever to the accelerator pedal are moved in accordance with the degree of the wheel acceleration slip, the present invention is practiced without necessitating an extensive reconstruction such as the installation of a stepping motor or the like, but with an addition of a quite simple arrangement, that is, the provision of the control piston between the first and second cables and the provision of the pulley arrangement between the control piston and the accelerator pedal.

PREFERRED EMBODIMENT OF THE INVENTION

A preferred embodiment of the present invention will now be described with reference to accompanying drawings.

Figure 3:
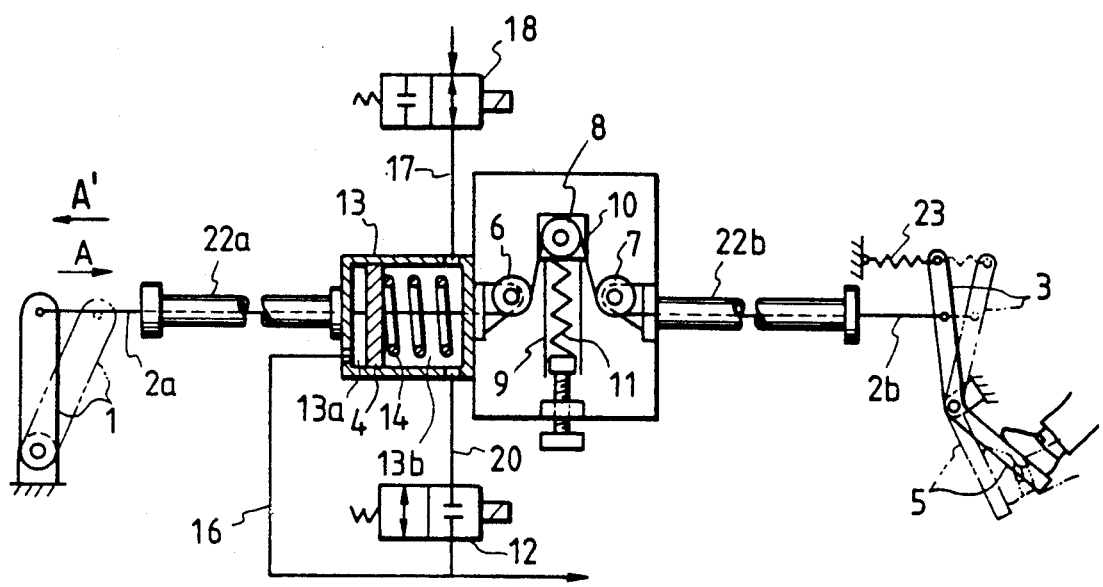
FIG. 3 shows the traction control system in which the accelerator pedal is slightly pressed down.
Figure 4:
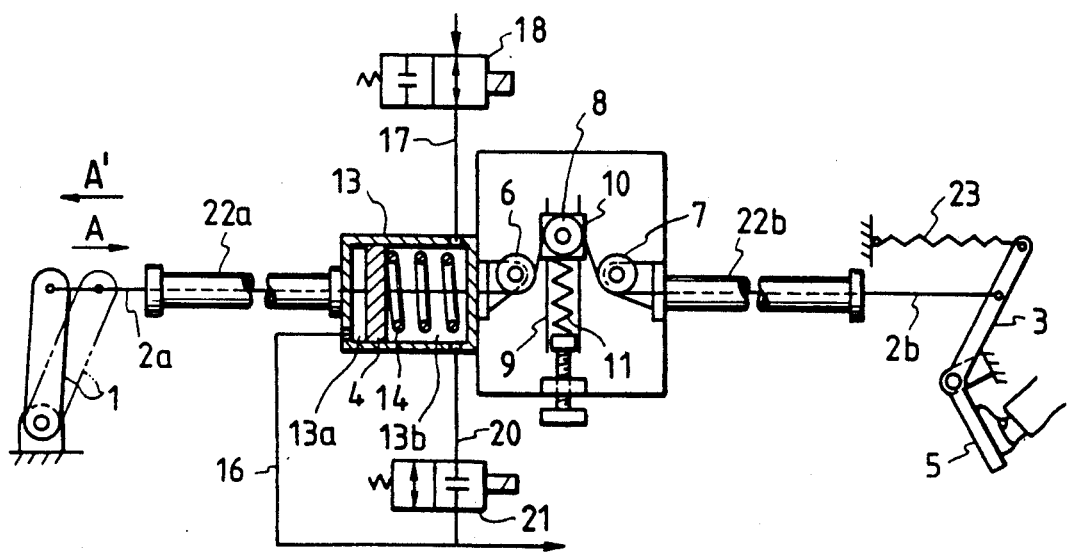
FIG. 4 shows the traction control system in which the accelerator pedal is strongly and deeply pressed down.
Figure 5:
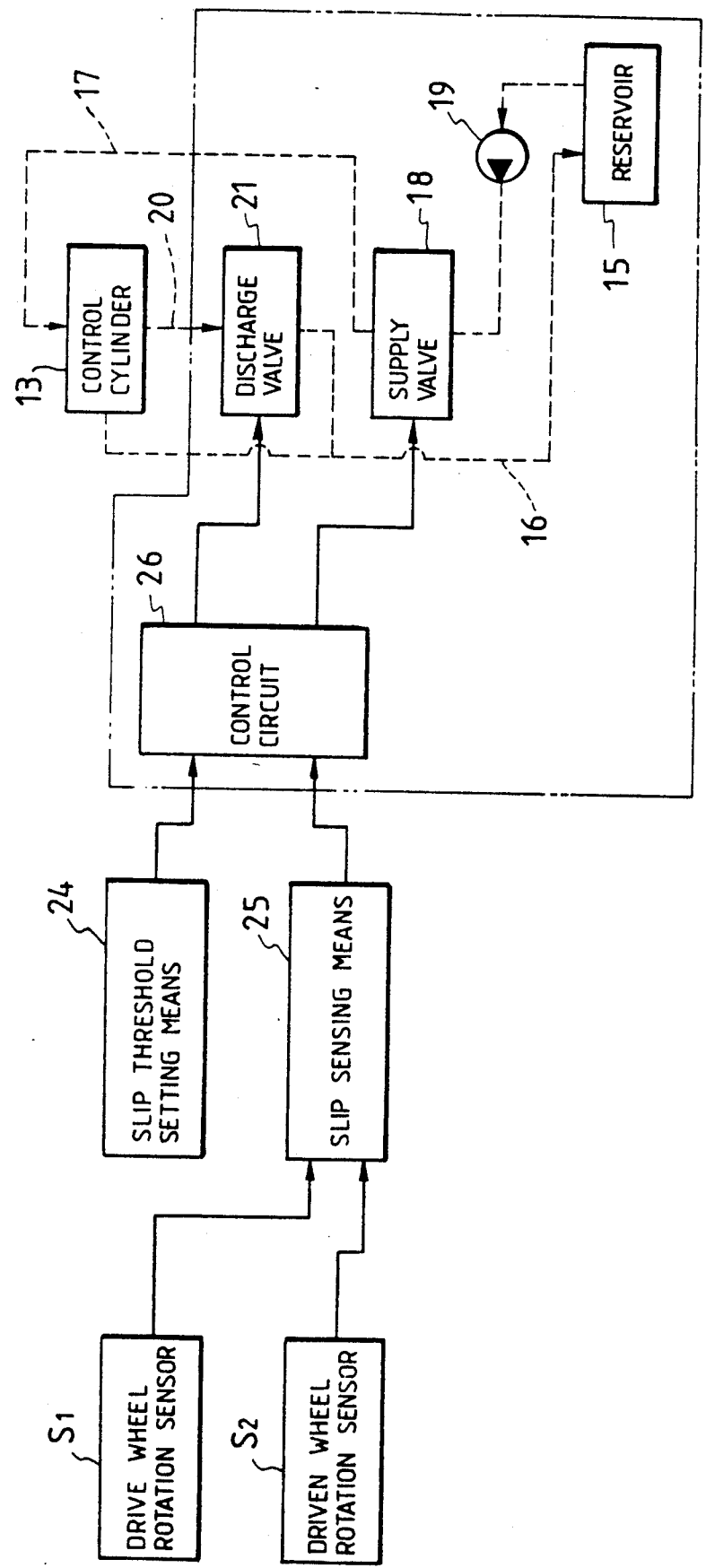
FIG. 5 is a block diagram showing the control of the system.

FIGS. 1 to 4 are partial cross-sectional front view showing a traction control system according to the present invention. FIG. 5 is a block diagram showing the control of the system.

The system of the present invention is provided with a throttle lever 1 which increases an amount of a fuel supplied to an engine of a vehicle when it is pivotally moved toward a direction of an arrow A. The system comprises a first cable 2a an end of which is connected to the throttle lever 1 and the other end is connected to a control piston 4 mounted within a control cylinder 13. There is further provided a second cable 2b an end of which is connected to an accelerator lever 3 while the other end is connected to the control piston 4. The first and second cable 2a and 2b are guided by outer flexible tubes 22a and 22b, respectively. With this arrangement, when an accelerator pedal 5 interconnected with the accelerator lever 3 is pressed down toward a direction of an arrow B, the throttle lever 1 is pivotally moved toward the direction of the arrow A. The accelerator lever 3 is returned to its original position while the pedal 5 is not pressed down.

The second cable 2b is guided between the accelerator lever 3 and the control piston 4 by a front and rear fixed pulleys 6 and 7 and by a movable pulley interposed therebetween. A bearing 10 for the movable pulley 8 is guided by a guide member 9 for freely moving therealong, whereas the movable pulley 8 is urged by a balance spring 11 in a direction of an arrow C thereby stretching the second cable 2b. An elastic force of the balance spring 11 can be adjusted by an adjusting screw 12.

A compression spring 14 is disposed within the control cylinder 13 mounting therein the control piston 4 so that the control piston 4 is always urged toward a direction of an arrow A' opposite to the direction of the arrow A. The interior space of the control cylinder 13 is divided into a left-hand atmospheric chamber 13a and a right-hand control chamber 13b. As shown in FIG. 5, the atmospheric chamber 13a communicates with a reservoir 15 of a pressure control device P through a fluid passage 16 whereas the control chamber 13b communicates with an electro-magnetically operatable supply valve 18 of normally closed type through a fluid passage 17. The fluid pressure of a pump 19 can be applied to the control chamber 13b via the supply valve 18. The control chamber 13b also communicates with an electro-magnetically operable discharge valve 21 of normally open type through a fluid passage 20 and, accordingly, the fluid pressure in the control chamber 13b can be discharged from the fluid passage 16 to the reservoir 15 via the discharge valve 21.

The elastic force of the balance spring 11 urging the movable pulley 8 is set as follows.

Figure 1:
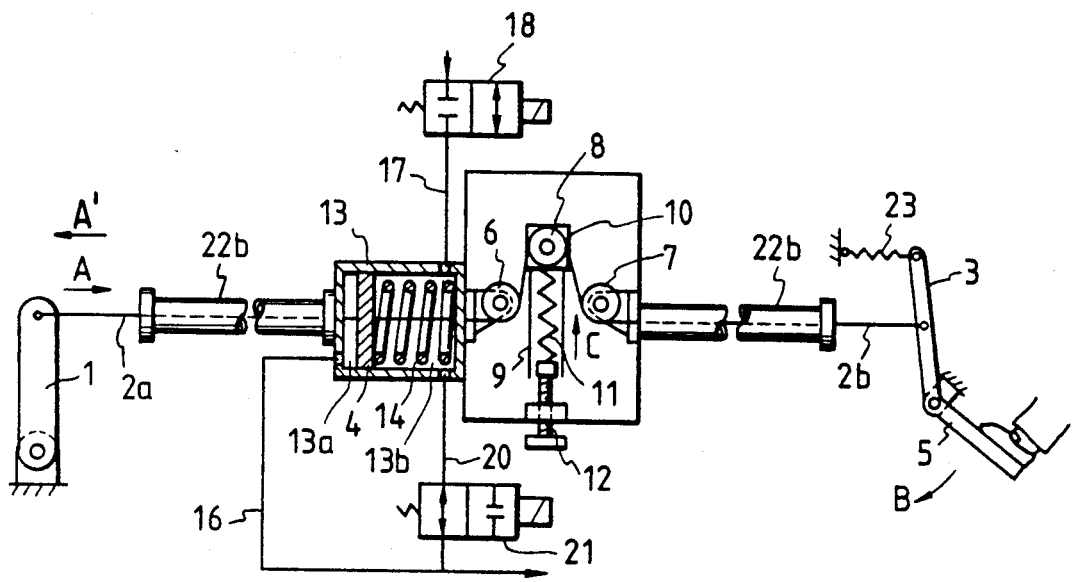
FIG. 1 is a cross sectional front view showing a traction control system according to the present invention in which an accelerator pedal is not pressed down.
Figure 2:
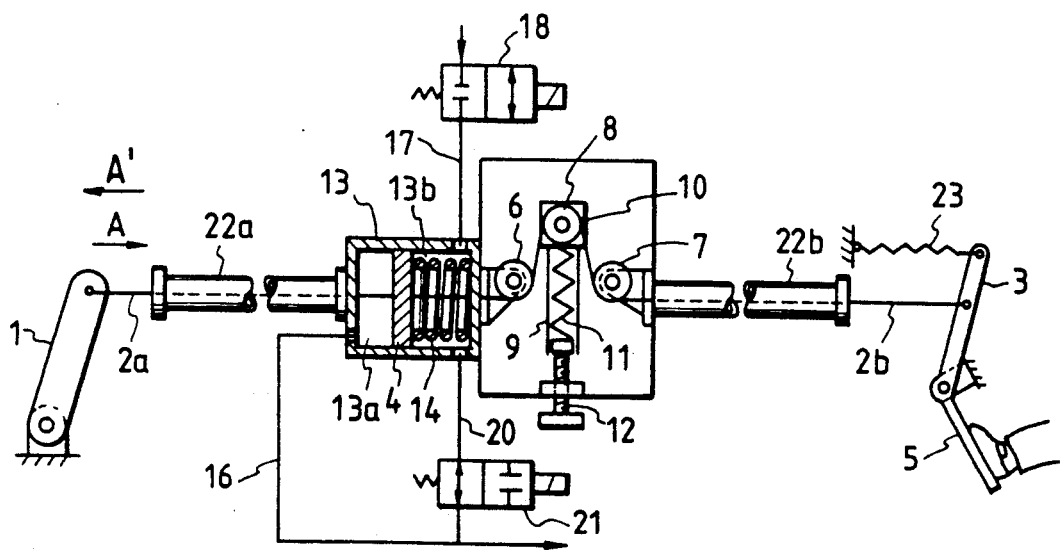
FIG. 2 shows the traction control system in which a fluid pressure is not supplied to a control chamber while the accelerator pedal is pressed down.

The balance spring 11 is not compressed in the condition of FIG. 2 in which the accelerator pedal 5 is pressed down with the liquid pressure not supplied to the control chamber 13b of the control cylinder and in the condition of FIG. 3 in which the accelerator pedal 5 is slightly pressed down with the liquid pressure supplied to the control chamber 13b. However, in the condition of FIG. 4 in which the accelerator pedal 5 is deeply pressed down with the fluid pressure supplied to the control chamber 13b, the tension of the second cable 2b between the control piston 4 and the accelerator lever 3 becomes so great that the balance spring 11 is compressed thereby causing the movable pulley 8 to move toward the fixed pulleys 6 and 7.

The supply of the fluid pressure to the control cylinder 13 through the supply valve 18 and the discharge of the fluid pressure from the control cylinder 13 through the discharge valve 21 are controlled by comparing a slip condition of the vehicle with a slip threshold level. More specifically, a slip rate at which a coefficient of adhesion of the tires to the road surface is the maximum is set as a slip threshold level by a slip threshold setting means 24. An actual slip rate at a time when the vehicle starts to move and accelerates is calculated by a slip detecting means 25 in accordance with an output of a rotation sensor S1 for the drive wheels and an output of a rotation sensor S2 for driven wheels. In accordance with a difference between the slip threshold level and the thus calculated actual slip rate, the fluid pressure is introduced into the control cylinder 13 thereby returning the throttle lever 1.

As shown in FIG. 2, when no slip is generated, the supply valve 18 is in its normal closed condition and the discharge valve 21 is in its normal open condition and, therefore, no fluid pressure is supplied to the control cylinder 13, so that the cables 2b and 2a move in accordance with the operation of the accelerator pedal 5.

If the actual slip rate of the vehicle increases so that the difference between the slip threshold level and the actual slip rate reaches a predetermined value, a control circuit 26 outputs a wheel acceleration slip signal to open the supply valve 18 and close the discharge valve 21. As a result, the fluid pressure is supplied from the pump 19 to the control chamber 13b of the control cylinder 13 so that the control piston is urged to move in the direction of the arrow A' thereby moving the first cable 2a in the direction of the arrow A' and, therefore, the throttle lever 1 returns to its original position.

While the slip of the vehicle generates, in the case where the accelerator pedal 5 is slightly pressed down with the fluid pressure supplied to the control chamber 13b, as shown in FIG. 3, the throttle lever 1 returns to its original position as indicated in a solid line while the accelerator lever 3 and the accelerator pedal 5 also return to their original positions indicated in solid lines. Under this condition, the movable pulley 8 is not moved since the tension of the second cable 2b is smaller than the force of the balance spring 11. On the other hand, in the case where the accelerator pedal 5 is strongly and deeply pressed down with the liquid pressure supplied to the control chamber 13b, as shown in FIG. 4, the throttle lever 1 returns to the position shown in the solid line due to a slack of the first cable 2a caused by the movement of the control piston 4. In this condition, however, since the tension of the second cable 2b increases and becomes greater than the force of the balance spring 11 due to the movement of the control piston 4, the movable pulley 8 is moved and, accordingly, the accelerator pedal 5 does not move.

A starting acceleration slip control for controlling a slip of drive wheels of the vehicle occurring at a time when the vehicle starts to move and accelerates will now be described.

Figure 6:
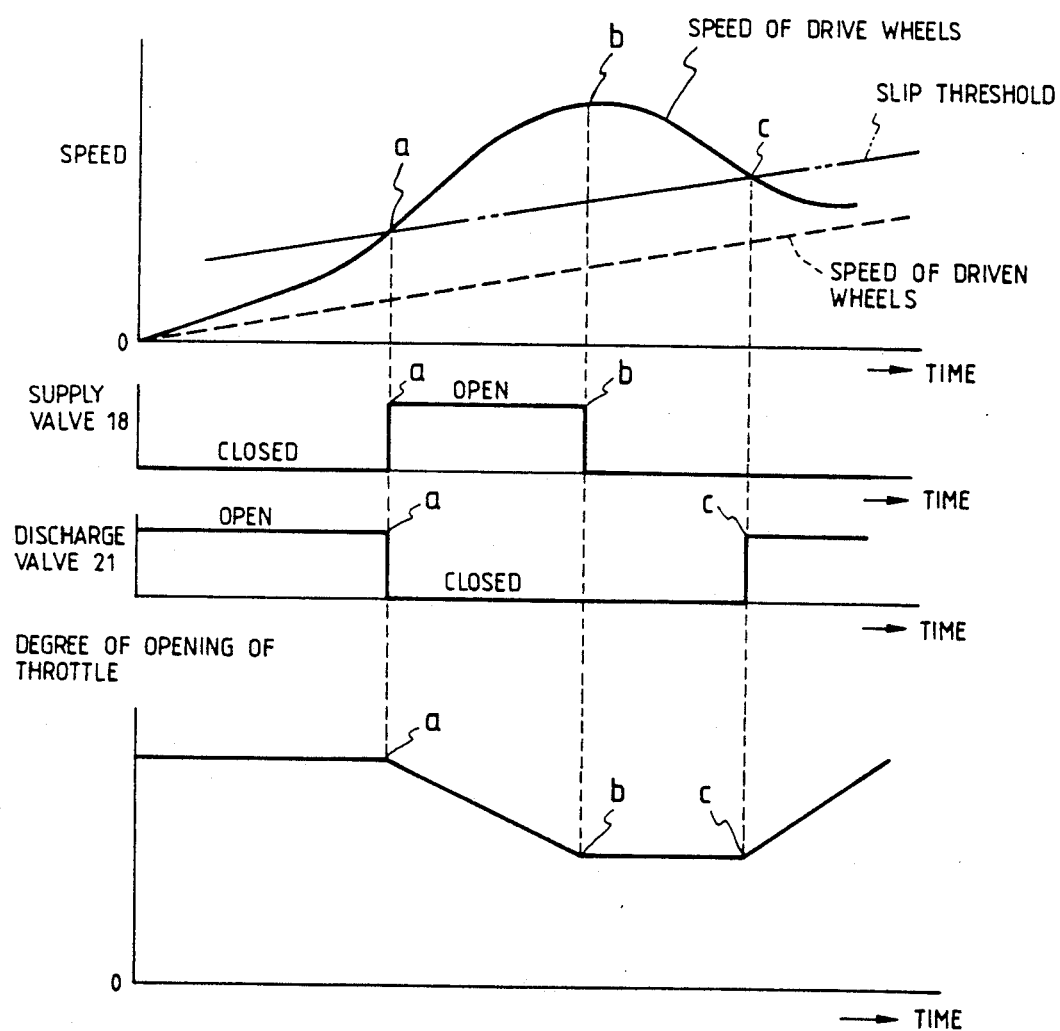
FIG. 6 shows a characteristics of the control shown in FIG. 5.

FIG. 6 shows characteristics of the control. When the accelerator pedal 5 is pressed down, the vehicle starts to move. At this time, the supply valve 18 is in its closed condition whereas the discharge valve 21 is in its open condition and, therefore, the fluid pressure is not supplied to the control chamber 13b of the control cylinder 13, so that the starting of the vehicle is controlled in accordance with the operation of the accelerator pedal 5.

The drive wheels gradually accelerates to increase the actual slip rate of the drive wheels. A wheel acceleration slip signal is outputted from the control circuit 26 at a point a at which the actual slip rate reaches the slip threshold level, so that the supply valve 18 opens whereas the discharge valve 21 closes. As a result, the fluid pressure of the pump 19 is supplied to the control chamber 13b of the control cylinder 13 via the supply valve 18 and the fluid passage 17, so that the control piston 4 is moved in the direction of the arrow A' and, accordingly, the first cable 2a moves in the same direction. As a result, the throttle lever 1 returns to its original position to reduce the torque of the engine of the vehicle, thereby gradually reducing the increase rate of the rotational speed of the drive wheels.

When the accelerator pedal 5 is slightly pressed down, the accelerator pedal 5 is returned because of the movement of the second cable 2b in the direction of the arrow A'. On the other hand, when the accelerator pedal 5 is strongly and deeply pressed down, the movable pulley 8 is urged to move so that the accelerator pedal 5 is maintained in the position to which it is pressed down.

The speed of the driving wheels reaches to a peak value at a point b, the supply valve 18 closes under the instruction of the control circuit 26, so that the control piston 4 stops to prevent the returning movement of the throttle lever 1, thereby maintaining the opening degree of the throttle 1 at a constant level.

When the actual slip rate is further decreased and returned to the slip threshold level at a point c, the control circuit 26 generates the instruction to open the discharge valve 21, so that the fluid pressure in the control chamber 13b is discharged through the discharge valve 21 to the reservoir 15 to thereby move the control piston 4 in the direction of the arrow A. As a result, the throttle lever 1 moves in the accelerating direction (direction A) to increase the opening degree of the throttle thereby accelerating the vehicle again.

As described above, in accordance with a variation in the speed of the drive wheels, the opening and closing of the supply valve 18 and discharge valve 21 are repeated under the instruction of the control circuit 26 to thereby achieve a suitable starting acceleration control. Therefore, full use of the adhesion between the tires of the vehicle and the road surface can be attained.

The above control by the control circuit 26 can be modified in various manners.

The pressure control device may be of the type utilizing compressed air rather than fluid.

The control circuit 26, the slip threshold level setting means 24 and the slip detecting means 25 may consist of a microcomputer.

With the traction control system thus constructed according to the present invention, when a wheel acceleration slip begins to occur, the throttle lever 1 is operated through the operation of the pressure control device P to control the traction to an optimum level. At this time, if the accelerator pedal 5 is strongly and deeply pressed down, the movable pulley 8 moves while compressing the balance spring 11. On the other hand, if the pedal 5 is slightly pressed down, the accelerator pedal 5 returns while the movable pulley 8 is not moved Therefore, the suitable wheel acceleration slip control is attained with regardless of whether the amount of pressing-down of the accelerator pedal 5 is large or small.

Thus, the control of the opening degree of the throttle effected by a driver and the automatic control of the traction are always carried out in combination depending upon the degree of the slip. Therefore, the control of the acceleration at the time when the vehicle starts to move and accelerates can be achieved in such a manner that the will of the driver can be well reflected to an extent not to invite an excessive slip.

The traction control system of the present invention is of such a construction that the cables 2a and 2b which connect the throttle lever 1 to the accelerator pedal 5 via the control piston 4 move in accordance with the degree of the wheel acceleration slip. Therefore, the present invention can actually be practiced without necessitating an extensive reconstruction such as the installation of a stepping motor, but merely with adding a quite simple arrangement, that is, the provision of the control piston between the cables 2a and 2b and the provision of the pulley arrangement between the control piston 4 and the accelerator pedal 5.

In the system of the present invention, when the accelerator pedal 5 is slightly pressed down, the accelerator pedal 5 returns because of the movement of the control piston 4 based on the acceleration slip signal. Therefore, this will inform the driver of that he has excessively pressed down the accelerator pedal, which is also convenient to the control of the opening degree of the throttle effected by the driver.

What is claimed is:

1. A traction control system for preventing an acceleration slip of a vehicle wheel by controlling an opening degree of an engine throttle, comprising:
   a throttle lever;
   an accelerator pedal;
   a control cylinder disposed between said throttle lever and said accelerator pedal, said control cylinder having therein a control chamber;
   a control piston mounted within said control cylinder;
   a first cable an end of which connects to said control piston whereas the other end of which connects to said throttle lever;
   a second cable an end of which connects to said control piston whereas the other end of which connects to said accelerator pedal;
   means for guiding said second cable;
   means for stretching said second cable toward through said guiding means;
   pressure control means for supplying a pressure to said control chamber of said control cylinder whereby said control piston moves to return said throttle lever while slackening said first cable.

2. The traction control system of claim 1, further comprising a pump and a reservoir, wherein said pressure control means comprises: an electro-magnetically operatable supply valve of normally closed type which supplies a pressure of said pump to said control chamber when it opens; and an electro-magnetically operatable discharge valve of normally open type which discharges the pressure from said control chamber to said reservoir when it closes.

3. The traction control system of claim 1, wherein said guiding means comprises a pair of fixed pulleys, a movable pulley disposed between said fixed pulleys and a guide member containing therein said stretching means.

4. The traction control system of claim 3, wherein said movable pulley having a bearing freely guided by said guide member.

5. The traction control system of claim 1, wherein the force of said stretching means is adjustable by a screw.

6. The traction control system of claim 3, wherein the force of said stretching means is preset in such a manner that: said stretching means is not compressed in a condition where the pressure is not supplied to said control chamber of said control cylinder when said accelerator pedal is pressed down; and said stretching means is compressed in a condition where the pressure is supplied to said control chamber of said control cylinder when said accelerator pedal is strongly and deeply pressed down thereby allowing said movable pulley to move toward said guiding means.

7. The traction control system of claim 1, further comprising a return spring mounted in said control chamber of said control cylinder, said return spring urging said control piston to return when said accelerator pedal is released.

8. The traction control system of claim 7, wherein the elastic force of said return spring is smaller than that of said stretching means.

9. The traction control system of claim 2, wherein said pressure control means further comprises a control circuit outputting an acceleration slip signal to said supply valve and to said discharge valve.

10. The traction control system of claim 1, wherein said pressure control means employs a fluid pressure.

11. The traction control system of claim 1, wherein said pressure control means employs an air pressure.

12. The traction control system of claim 1, wherein said stretching means comprises a balance spring.

13. The traction control system of claim 9, wherein said control circuit consists of a microcomputer.

* * * * *